May 5, 1931.  C. E. MERRICK  1,803,341
CUTTERHEAD FOR MEAT SKINNING MACHINES
Filed Jan. 30, 1929
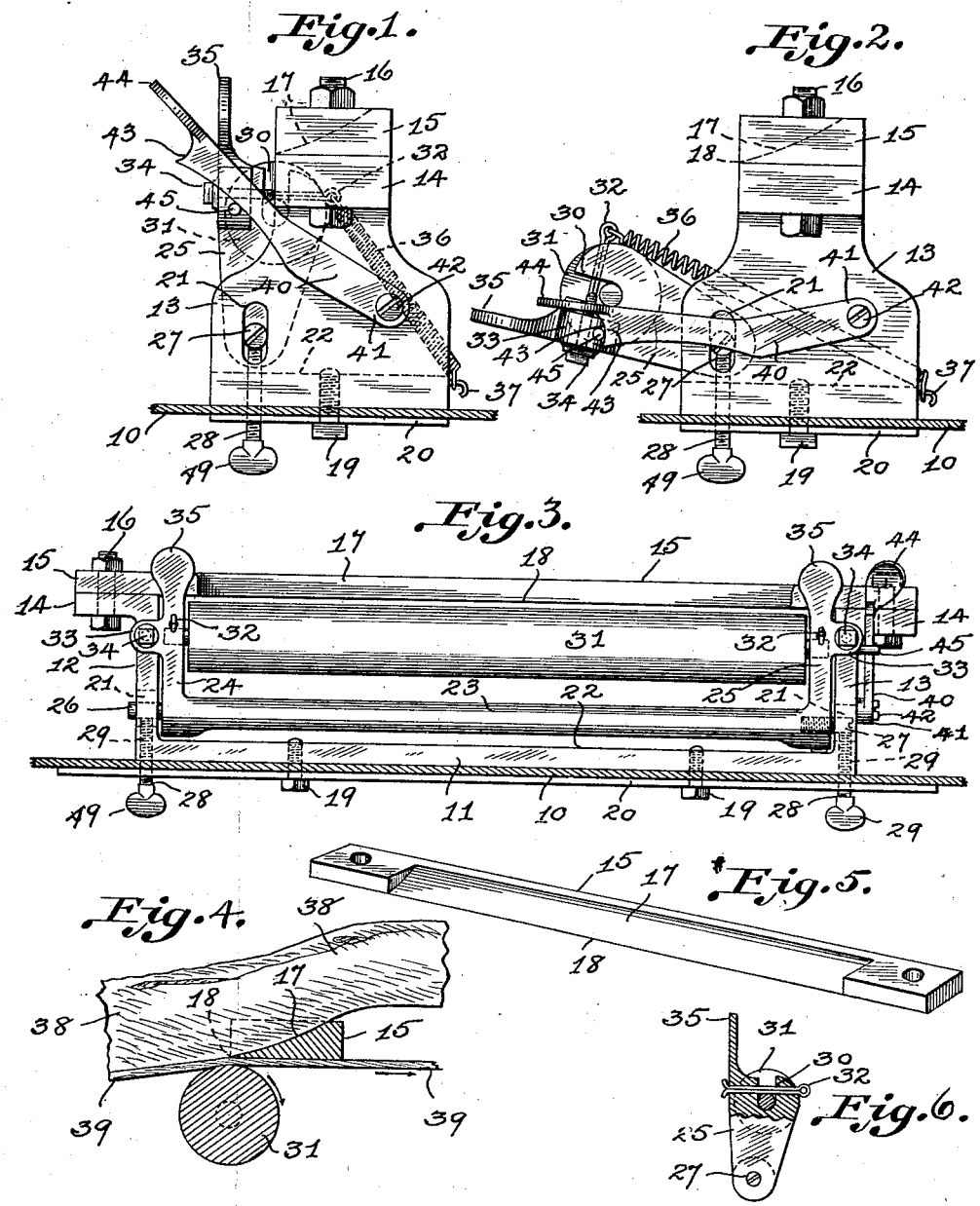

UNITED STATES PATENT OFFICE

CHARLES E. MERRICK, OF BALTIMORE, MARYLAND

CUTTER HEAD FOR MEAT-SKINNING MACHINES

Application filed January 30, 1929. Serial No. 336,034.

This invention relates to an improved cutter-head for meat skinning machines and has particular reference to a cutter for a machine which is especially designed for severing bacon meat from its rine or skin.

The particular cutter herein shown and described is especially designed for use with a meat skinning machine illustrated and described in a companion application for patent executed and filed by me on even dates herewith.

An object of the present invention is to provide an improved construction of cutter-head which is simple in construction and operation and having a novel means for supporting the roller and effecting its adjustment with respect to the cutter-blade.

Another object is to provide a novel means for supporting the roller in order that it may be swung down and held in this position while the slab of meat is being positioned and which means may readily be tripped to allow the roller to swing back into operative position.

With these, and other objects in view, the invention is illustrated in the accompanying drawings in which,—

Fig. 1 shows the cutter head in end elevation with the roller in position with respect to the cutter-blade for operation.

Fig. 2 illustrates the same parts but with the roller swung down and latched to permit positioning of the slab of meat and the rine with respect to the cutter.

Fig. 3 shows the entire cutter head on a smaller scale but in front elevation,—that is, viewed from that side at which the slab of meat and rine is entered.

Fig. 4 illustrates a sectional elevation through the cutter and roller with a slab of meat in place and the rine-severing operation started.

Fig. 5 shows the detached cutter-blade in perspective, and

Fig. 6 illustrates an end view of the detached roll carrier.

In the drawing, the numeral 10 designates a table-top on which the supporting frame of the cutter-head is seated. This supporting-frame consists of a flat horizontal bed-plate 11 with vertical end-supports 12 and 13 respectively each of which, in this instance, has an out-turned flange 14 at its upper edge. The cutter-blade 15 has its two ends seated on the flanged upper ends of the end-supports 12 and 13 and extends horizontally from one support to the other. Bolts 16, rigidly secure the cutter-blade in position.

The cutter-blade 15, has a bevel 17 along one side which produces the cutting-edge 18. Suitable bolts 19 pass up through the table from the under side and screw into the bed-plate 11,—a reinforcing plate 20 preferably being placed directly beneath the table top through which the securing bolts 19 pass.

Each end support has a vertical guide-slot 21 extending all the way therethrough in a horizontal direction but above the upper surface 22 of the bed-plate and these vertical guide-slots are located adjacent to that side edge of each support which may be termed the entering side in that it is the side at which the slab of meat and its rine are to be entered.

Between the two vertical end-supports 12 and 13, I locate a single frame comprising a horizontal lower bar 23, and two right-angle bearing-ends 24 and 25. Each of these bearing-ends has a bearing stud or pin 26 and 27.

These studs or pins project from the frame in horizontal alinement with the lower cross-bar 23 into which they project and in practice, the stud or pin 27, is screw-threaded at its inner end so as to be detachable,—a cross-slot being provided at its outer end for engagement by a screw-driver.

These two studs or pins 26 and 27 project from the opposite ends of the frame and enter the vertical guide-slots 21 in the end supports 12 and 13 but are free to be moved vertically in said slots.

To support these studs or pins so that they may be moved or vertically adjusted in the guide-slots, I provide adjusting bearing-bolts 28 which pass up through the reinforcing plate 20; the table-top 10 and screw up through threaded bores 29 in the bed plate 11 and also up through each end support and the upper ends of these adjusting bearing bolts project into the lower ends of the guide-slots 21. These upper projecting ends of the bearing-bolts form vertically-adjustable supports on which the ends of the studs or pins 26 and 27 are seated in said guide-slots, as shown in Figs. 1 and 2.

The lower ends of the bearing-bolts are provided with wing-heads 49 which facilitate their turning by the thumb and fingers.

It is obvious that by screwing the bearing-bolts up the studs and the frame, to which they are attached, will be moved vertically.

The bearing-ends 24 and 25 each have a bearing-notch 30 in their upper ends and a roller 31, has its opposite ends loosely mounted in the notches 30 so as to extend horizontally between ends 24 and 25 of the frame.

Cotter-pins 32 are passed through suitable passages provided in the bearing-ends so as to extend across the notches 30 and hold the roller in place.

Side lugs 33 are provided on the bearing-ends 24 and 25 so as to project laterally and overlap the front vertical faces of the end-supports 12 and 13 and stop-screws 34 pass through said lugs and form adjustable stops at the forward side of the lugs to limit the movement of the roller-frame toward the front faces of said end-supports.

The upper extremities of the bearing-ends 24 and 25 have flattened lugs 35, for finger-engaging purposes because the roller-frame and roller are to be swung down at times, as shown in Fig. 2, for a purpose that will presently be explained.

A coiled spring 36 has one end attached to the eye of one of the cotter-pins 32 and extends forwardly over the bed-plate 11, and has its other end engaged with a hook 37 on the bed-plate. This spring yieldingly holds the roller frame in an upright position with the roller beneath the cutting-blade, but the spring will yield when it is desired to swing the roller-frame down as clearly shown in Fig. 2.

By reference to Fig. 1, it will be clear that if the vertical bearing-bolts 28, are screwed up into the guide-slots 21 that their upper bearing-ends will lift the studs or pins 26—27 and thereby vertically adjust the entire roller-frame and roller so the periphery of the latter may be brought close to the cutting-edge 18 of the cutter-blade, and that by adjusting the stop-bolts 34, the roller-frame may be adjusted so the roller 31 may be projected more or less under the cutting-edge of the blade when it is in the raised position.

When positioning the slab of meat 38 with respect to the cutter and starting the rine 39 beneath the cutter while the meat will pass over the cutter, as shown in Fig. 4, it is very much more convenient to effect this positioning if the roller-frame and roller are swung down, and as it is desirable to have the use of both hands to handle the slab and engage a clamp (such as is illustrated in my companion application hereinbefore referred to) to the forward edge of the rine, it is decidedly more convenient to provide some latch means that will hold the roller-frame and roller down.

I have therefore provided a latch device to hold the roller-frame down which will now be explained.

The end-support 13 of the bed-plate carries a latch-lever 40, whose end 41, is pivoted thereto by a pivot-screw 42. This lever extends along the side of the said end-support and has a latching-shoulder 43 at its forward end and also has a flat trip-lug 44, immediately over the said shoulder so the finger of the operator may readily actuate the lever.

A locking and guide-pin 45, extends laterally from the side lug 33 of the roller-frame and the latch lever, when the roller-frame is up, has its under edge resting upon said pin. When the roller-frame is in the raised position and the latch-lever is not in use, the latter has an upwardly inclined position, as shown in Fig. 1 and would fall by gravity if it were not supported by the lateral pin 45. Therefore, when the roller-frame is swung down, as in Fig. 2, the latch lever swings down, riding on the pin 45 as it does so, but the pin moves forwardly along the under surface of the lever as the two swing down, because of the differences in their pivot points, and the pin finally passes from beneath the latch-lever and the latter then drops so that the pin 45 will then have position in front of the latching-shoulder 43. When the pin is engaged by the shoulder 43, the roller-frame cannot swing up, because the pin 45 must swing on a smaller arc than the latching-shoulder 43 and the latch therefore holds the roller-frame down.

After the slab of meat and the rine have been positioned and the rine engaged by a clamp which is to draw it past the cutter,—the latch-lever 40 is merely kicked up by the operator's finger hitting beneath the trip-lug 44, and the spring 36 draws the roller-frame up and holds it there while the cutting operation is carried on.

It will be noted that the roller-frame has its two studs or pins 26—27 entering the end-supports 12 and 13 and that the pin 27 has a threaded inner end. This is provided so the roller-frame can be fitted between the two end-supports and the one pin 27 screwed in through the guide-slot 21 in end-support 13 after the frame has been inserted. Were it not for the removability of one of the pins, the roller-frame could not be fitted between the end-supports.

Having described my invention, I claim,—

1. In a cutter head for meat skinning machines the combination with two spaced vertical supports, of a roller-frame pivotally sustained between said supports to swing up and down—said frame having a projection at one end which extends crosswise past the vertical support at that end, a roller carried by the frame, a cutter-blade sustained by and extending between the two supports, spring means for holding the frame up and a latch-lever having one end pivotally attached to the side of one vertical support and when the roller-frame is up resting upon the projection from the frame,—said latch-lever swing down as the frame is moved down and making locking engagement with the frame projection to hold the frame down.

2. In a cutter head for meat skinning machines the combination with a flat bed-plate having a fixed vertical support at each end thereof and each support being provided with a vertical guide-slot that extends therethrough from one side to the other, of a swinging roller-frame between the two supports said frame comprising a lower cross-bar and two right-angle bearing ends, each bearing end having a bearing stud projecting horizontally therefrom into the vertical slots of the said fixed supports and at least one of said studs being detachable, supporting screws extending up through the fixed supports into said vertical slots and engaging the under sides of the said studs, a roller carried by the swinging frame, means for yieldingly holding the frame in the swung-up position and means for locking the frame down against the action of the yielding means.

3. In a cutter head for meat skinning machines the combination with two spaced vertical supports, of a roller frame comprising a lower horizontal bar with a right-angle bearing-end at each end of said bar and each bearing-end having a bearing-notch in its upper end, means for pivotally supporting the frame adjacent to its lower horizontal bar, a roller having its ends journaled in the bearing notches of the bearing-ends, pins extending through the bearing-ends across the bearing notches to hold the journals of the rollers in said notches, a cutter-blade supported by the spaced vertical supports, a latch lever having one end pivotally attached to the side of one of the supports with its free end freely projecting toward the roller frame, means carried by the frame for loosely sustaining the latch lever when the frame is up and to be engaged by the lever when the frame is down to lock the frame down and spring means for yieldingly holding the frame up.

In testimony whereof I affix my signature.

CHARLES E. MERRICK.